| United States Patent [19]
Yashiro et al. | [11] 4,341,558
[45] Jul. 27, 1982 |
|---|---|

[54] METAL SURFACE COATING AGENT

[75] Inventors: Kuniji Yashiro, Kanagawa; Yoshio Moriya, Yokohama, both of Japan

[73] Assignee: Hooker Chemicals & Plastics Corp., Warren, Mich.

[21] Appl. No.: 238,881

[22] Filed: Feb. 27, 1981

[51] Int. Cl.$^3$ ................................................ C23F 7/14
[52] U.S. Cl. .............................. 106/14.12; 106/14.21; 148/6.15 R; 148/6.27; 428/472
[58] Field of Search ...................... 148/6.15 R, 6.15 Z, 148/6.27; 106/14.12, 14.21; 428/472

[56] References Cited
U.S. PATENT DOCUMENTS

| 4,017,334 | 4/1977 | Matsushima et al. | 148/6.15 R |
|---|---|---|---|
| 4,187,127 | 2/1980 | Yashiro et al. | 148/6.15 R |
| 4,264,378 | 4/1981 | Oppen et al. | 148/6.15 Z |

*Primary Examiner*—Lorenzo B. Hayes
*Attorney, Agent, or Firm*—Richard P. Mueller; Arthur E. Kluegel

[57] ABSTRACT

A composition and process are useful for imparting corrosion resistance and paint receptivity to metal surfaces. The process involves application of an aqueous wet film which is dried in place and thus avoids effluent problems from conventional processes involving rinsing. The composition contains a water soluble titanium zirconium compound, an inositol 2-6 phosphate ester and silica.

8 Claims, No Drawings

METAL SURFACE COATING AGENT

BACKGROUND OF THE INVENTION

This invention concerns a metal surface coating agent and it is intended to provide a metal surface coating agent which improves the corrosion resistance of the surface of metals such as iron, zinc, aluminum and their alloys and which improves the corrosion resistance after painting and the adhesion of the paint film.

In the past phosphoric acid salt treatments and chromate treatments have been carried out as corrosion preventing and paint undercoating treatments for metals. In the case of phosphoric acid salt treatment the effluent discharge from the treatment line has had to be subjected to treatments for the removal of heavy metals by the neutralization coagulation method and for the removal of oils by the pressure flotation method and there are further disadvantages in that, although it is usual to replenish the rinse water that has overflowed by supplying fresh water to the final rinse stage, this method still involves the use of a large amount of wash water and since the effluent is discharged from the system the plant costs for effluent treatment are high. Furthermore, with the chromate treatments in which chromic acid, or chromates, are the main components the costs are lower and the corrosion resistance is better but there are many cases where paint quality weakens as the bath ages. Moreover chromic acid and its salts have adverse human health effects, there are problems with hazards of spontaneous reaction and the effluent control standards for the use of chromic acids are severe. Moreover many who buy the commercially available chromate treated metal sheet put the sheet through a forming process and after the forming process they subject the sheets to an alkaline cleaner in order to remove the lubricants that have been used in the forming process. The disadvantage in that the chromium is dissolved by the alkaline cleaner and the properties of the treated sheet are thus reduced by the alkaline cleaning process.

SUMMARY OF THE INVENTION

The inventors have now discovered a composition and process which improve the corrosion resistance of a metal surface, the corrosion resistance after painting, and the adhesion of the paint film. The agent which contains at least one compound selected from the group of water soluble titanium compounds and water soluble zirconium compounds, at least one inositol 2-6 phosphate ester or water soluble salt in which one or more hydrogen atoms have been replaced by alkali metals or alkaline earth metals, and silica. The process of the invention is the application and drying in place of the composition on a metal surface.

DETAILED DESCRIPTION OF THE INVENTION

Any water soluble titanium compounds can be used in this invention including $K_2TiF_6$, $Na_2TiF_6$, $(NH_4)_2TiF_6$, $Ti(SO_4)_2$, $TiOSO_4$ and the titanium compounds obtained by dissolving titanium oxide compounds in acids.

All water soluble zirconium compounds can be used in this invention including $Li_2ZrF_6$, $Na_2ZrF_6$, $K_2ZrF_6$, $(NH_4)_2ZrF_6$, $H_2ZrF_6$, $ZrOSO_4$, $Zr(SO_4)_2$, $Zr(OH)_4$, $ZrCl_4$, zirconium acetate and compounds obtained by dissolving zirconium oxide compounds in acids.

The amount of the water soluble titanium or zirconium compound that is added to the metal surface coating agent of this invention is determined by the wet film thickness applied to the metal surface and on the basis of Ti or Zr they are added to the coating agent so as to give surface deposits of 1–200 mg/m$^2$ and desirable 5–50 mg/m$^2$. If the rate is above 200 mg/m$^2$ the properties are not further improved and the process becomes uneconomical and if less than 1 mg/m$^2$ is used the effect is insignificant.

The inositol 2–6 phosphate ester that are used in this invention are inositol diphosphate ester, inositol triphosphate ester, inositol tetra-phosphate ester, inositol pentaphosphate ester and inositol hexaphosphate ester or salts in which the hydrogen atoms of the inositol 2–6 phosphate esters have been replaced with alkali metals or with alkaline earth metals, such as Na, K, Li, Mg, Ca, Sr, and Ba. Inositol hexaphosphate ester is generally called phytic acid. Furthermore the inositol di-pentaphosphate esters are obtained mainly by the hydrolysis of phytic acid and so industrially phytic acid is the most useful. The amount used is determined by the amount that is to be deposited on the metal surface, as in the case of Ti and Zr and is added to give a surface concentration of 1–500 mg/m$^2$ and desirably 5–200 mg/m$^2$. If more than 500 mg/m$^2$ is used the properties are not further improved but the system becomes uneconomical and if less than 1 mg/m$^2$ is used it has no significant effect.

The silica that is used in this invention can consist of Aerosil (Trade name Aerosil 350, Nippon Aerosil), Siloid (Fuji Devison Kagaku), an aqueous solution of the sodium salt of silic acid from which the sodium has been removed with an ion exchange resin, a commercially available silicic acid sol which contains 20–30% $SiO_2$, for example Registered Trade mark "Sunotekkusu" (Nichisa Kagaku), other gels of $SiO_2$ and silic acid sols obtained by dispersing the gels uniformly in an alkaline solution and silic acid sols which do not contain sodium ions and in which the sodium salt of silic acid is neutralized with a suitable acid and isolated.

When solid $SiO_2$ such as aerosil is used, the $SiO_2$ is uniformly dispersed in the solution in a colloidal state by adding small quantities while stirring with a high speed stirrer.

The amount of $SiO_2$ used is determined by the amount that is to be deposited on the metal surface so as to give a surface concentration of 20–2000 mg/m$^2$ and desirably 50–1000 mg/m$^2$. If more than 2000 mg/m$^2$ is used, paint adhesion decreases and if surface concentration of 20–2000 mg/m$^2$ and desirably 50–1000 mg/m$^2$. If more than 2000 mg/m$^2$ is used, paint adhesion decreases and if less than 20 mg/m$^2$ is used it becomes difficult to form a satisfactory film.

For preparing the metal surface coating agent of this invention the inositol phosphate ester and the silica are usually added after dissolving the water soluble titanium or zirconium compounds in water but any method such as that in which the silica is added after dissolving the water soluble titanium or zirconium compound and the inositol phosphate ester in water can be used. Moreover, in order to adjust the pH of the metal surface coating agent, any conventional alkaline bases such as ammonia, ethylamine or caustic soda and the oxides, hydroxides or carbonates of metals such as Al, Zn, Ni can be used and the pH is adjusted to 1–7 and desirably to 2-6. If the pH is less than 1 corrosion of the metal becomes excessive and if the pH is above 7 the performance is not sufficient.

The conditions of use of the metal surface coating agents of this invention involve applying a uniform coating to a clean metal surface from which all dirt such as grease has been removed to yield 1–20 g/m² of wet film. Application may be by roll coater or some other method giving uniform coverage and after coating the surface is dried by evaporating off the water component preferably with a drying machine such as a hot air drier. If the amount used is less than 1 g/m² of wet film difficulties are experienced in covering the metal surface completely and if more than 20 g/m² of wet film is used then not only do irregularities occur in the coating when drying as a result of the flowing of the coating solution but a large capacity drying plant or a long drying time will be needed.

The dry covering that is obtained with the metal surface coating agent is normally 100–3000 mg/m². Moreover, as required, water soluble film-forming organic polymer compounds such as polyacrylic acid, poly vinyl alcohol, poly hydroxyethylamylate can be added.

The corrosion resistance and the corrosion resistance after painting and the adhesion of the paint film of the surface of metals such as iron, zinc, aluminum and their alloys can be improved by the application of this invention.

This invention is further described in the following examples:

EXAMPLE 1

A metal surface coating agent was prepared in the way outlined below.

| Composition of the Metal Surface Coating Agent | |
|---|---|
| Ammonium fluotitanate | 10 parts by weight |
| Phytic acid (50% Aqueous Solution) | 16 parts by weight |
| Silica (Aerosil #200) | 30 parts by weight |
| PVA (Degree of polymerisation 1400) | 50 parts by weight |
| Deionized Water | 894 parts by weight |

The pH was adjusted to 5.3 using concentrated aqueous ammonia.

After cleaning the surface of a commercially available electro zinc plated steel sheet by wiping with acetone it was coated with the above-mentioned metal surface coating agent.

The coating was carried out with a roll coater and the system used a mesh roll for the metering roll for reverse coating and the amount of material coated in the wet coat was set at 10 g/m² by adjusting the space between the rolls.

Immediately after coating the sample was dried for 35 seconds at 120° C. in a hot air circulating oven. At this time the temperature of the sheet was 70° C.

As a reference example, identical sheet was cleaned in same manner, rinsed with water, and treated with a chromate treatment liquid with the composition shown below:

| Composition of the Chromate Treatment Liquid | |
|---|---|
| Anhydrous chromic acid | 10 parts by weight |
| Phosphoric acid | 1 parts by weight |
| Silicon hydrofluoride | 2 parts by weight |
| Chromium carbonate | 1 parts by weight |
| Sulfuric acid | 0.5 parts by weight |
| Water | 985.5 parts by weight |

The pH was adjusted to pH 2.0 with zinc carbonate.

The conditions of the chromate treatment involved treating for 10 seconds with a spray method at a temperature of 40° C. and then rinsing immediately with water and drying. The amount of Cr deposited was measured by X-ray fluoresence and was 28 mg/m².

The electrozinc plated steel sheets that had been treated as above were then coated with an alkyd-melamine based paint by the bar coating method and after setting for 20 minutes they were baked for 25 minutes in a hot air circulating oven at an air temperature of 140° C. to yield painted sheets with a paint film thickness of 30±2 microns. These painted sheets were then subjected to paint film adhesion tests and salt spray tests and the results of these tests are shown in Table 1.

Electro zinc plated steel sheets that had been treated as above but not painted were cleaned by spraying for 3 minutes with a commercially available alkaline cleaning solution at 20 g/l at 60° C. The samples were then rinsed with water for 15 seconds and dried in a drier. These specimens were then painted in exactly the same way as noted above and the results of paint film adhesion tests carried out on these painted samples are also shown in Table 1.

TABLE 1

| | Paint Film Adhesion Test | | Salt Spray Test | |
|---|---|---|---|---|
| Alkaline Cleaner | No | Yes | No | Yes |
| Example 1 | 5 | 4 | 4 | 3 |
| Reference example 1 | 3 | 1 | 3 | 1 |

Paint Film Adhesion Test*

The paint film was subjected to convex impact of 7 mm with an Erikesen tester, tape pulled and an assessment made on the basis of the 5 point scale given below:

| 5 points | No peeling of the paint film |
|---|---|
| 4 points | Peeling of the paint film less than 5% |
| 3 points | Peeling of the paint film 6–25% |
| 2 points | Peeling of the paint film 26–50% |
| 1 point | Peeling of the paint film more than 50% |

Salt Spray Test

A cross cut was made on the painted sheet down to the underlying metal using an NT cutter and after carrying out a salt spray test in accordance with JIS-Z-3271 for 120 hours the samples were washed with water and dried and the paint surface was tape pulled and the paint peeling from the cross cut part was assessed as follows:

| 5 points | No peeling |
|---|---|
| 4 points | Width of peeling on both sides of the cross cut. Less than 1mm |
| 3 points | Width of peeling on both sides of the cross cut. Less than 2mm |
| 2 points | Width of peeling on both sides of the cross cut. Less than 5mm |
| 1 point | Width of peeling on both sides of the cross cut. |

-continued

| | |
|---|---|
| 6mm or more | |

EXAMPLE 2

A metal surface coating agent was prepared as follows:

| | |
|---|---|
| Ammonium fluozirconate | 10 parts by weight |
| Phytic acid (50% aqueous solution) | 14 parts by weight |
| Silica (Aerosil #200) | 30 parts by weight |
| PVA (Degree of polymerisation 1400) | 50 parts by weight |
| Deionized water | 896 parts by weight |

The pH was adjusted to 5.5 with concentrated aqueous ammonia.

After wiping the surface of commercially available cold rolled steel sheets JIS-93141 with acetone and rinsing with water, they were coated with the above mentioned metal surface coating agent.

The coating was carried out with a roll coater and a mesh roll was used for the metering roll with a reverse roll and the amount coated as the wet film was set to a coating of 10 g/m² by adjusting the roll spacing. Immediately after coating the samples were dried for 50 seconds at 120° C. in a hot air circulating oven. The temperature of the sheet at this time was 70° C.

As reference example 2, after cleaning and wiping with acetone as above, identical samples were treated with an iron phosphate treatment solution that contained 10 g/l of ammonium dihydrogen phosphate by spraying at 50° C. for 2 minutes. Then the samples were immediately rinsed with water and given a chromate seal by treating with an aqueous solution that contained 0.1 g/l of anhydrous chromic acid and 0.05 g/l of orthophosphoric acid by spraying for 15 seconds at 50° C., and finally the samples were dried in a drier.

The steel sheets that had been treated as above were then coated with an alkyd-melamine paint using the bar coating method and after setting for 20 minutes the samples were baked in a hot air circulating oven with an air temperature of 140° C. to give painted sheets with a paint film of thickness 30±2 microns.

Paint film adhesion tests and salt spray tests were carried out on these painted sheets. The results are shown in Table 2.

Cold rolled steel sheets that had been treated as above were subjected to the same alkaline cleaner and by the same method as used in Example 1 and painted by the same method and the results of paint film adhesion tests and salt spray tests of these samples are also shown in Table 2.

TABLE 2

| | Paint Film Adhesion Test | | Salt Spray Test | |
|---|---|---|---|---|
| Alkaline Cleaner | No | Yes | No | Yes |
| Example 2 | 5 | 5 | 4 | 4 |
| Reference example 2 | 5 | 4 | 2 | 1 |

The tests were the same as in Example 1 except that the time period of the salt spray test was 72 hours.

EXAMPLE 3

A metal surface coating agent was prepared as follows:

| | |
|---|---|
| Lithium fluotitanate | 10 parts by weight |
| Phytic acid (50% aqueous solution) | 20 parts by weight |
| Silica (Aerosil #200) | 40 parts by weight |
| PVA (Degree of polymerisation 1400) | 50 parts by weight |
| Deionized water | 880 parts by weight |

The pH was adjusted to 5.5 using lithium hydroxide.

After cleaning the surfaces of commercially available pure aluminum sheets by wiping with acetone the samples were treated by immersion for 10 seconds in a 1% aqueous solution of caustic soda at 60° C. in order to remove the oxide film, rinsed immediately with water, and dried in a drier and the above identified metal surface coating agent was applied to the aluminum surface.

The coating was carried out with a roll coater and the system involved the use of a mesh roll as the metering roll with a natural roll and the amount coated in the wet film was set at 5 g/m² by adjusting the space between the rolls. Immediately after this the samples were dried for 30 seconds in a hot air circulating oven at 120° C. The sheet temperature at this time was 70° C.

For reference Example 3, an identical specimen was prepared in an identical manner and treated with the chromate solution noted below:

| | |
|---|---|
| Anhydrous chromic acid | 10 parts by weight |
| Phosphoric acid | 1 part by weight |
| Hydrofluoric acid | 2 parts by weight |
| Sulfuric acid | 0.5 parts by weight |
| Water | 986.5 parts by weight |

The pH was adjusted to 2 using aluminum hydroxide.

The conditions of treatment involved treating the samples by a spray method at 40° C. for 10 seconds and then immediately giving the samples a water rinse and drying. The Cr deposited on the surface was measured using x-ray fluorescence and found to be 31 mg/m².

The pure aluminum sheets that had been treated in accordance with example 3 and reference example 3 were painted with an alkyd melamine paint using the bar coating method and after setting for 20 minutes the samples were baked for 25 minutes in a hot air circulating oven with an air temperature of 140° C. to give painted sheets with a paint film of thickness 30±2 microns.

The results of paint film adhesion tests and salt spray tests carried out with these painted sheets are shown in Table 3.

The results of paint film adhesion tests and salt spray tests of samples of pure aluminum sheets that had been treated as above but given an alkaline cleaning by the same method as noted in Example 1 and then painted by the same method are also shown in Table 3.

TABLE 3

| | Paint Film Adhesion Test | | Salt Spray Test | |
|---|---|---|---|---|
| Alkaline Cleaner | No | Yes | No | Yes |
| Example 3 | 5 | 5 | 5 | 5 |
| Reference Example 3 | 4 | 2 | 5 | 4 |

The tests were the same as those in Example 1 except that the time in the salt spray test was 500 hours.

What is claimed is:

1. An aqueous composition which consists essentially of at least one water soluble compound of zirconium or titanium, silica, and as the sole source of phosphate, an inositol 2-6 phosphate ester.

2. The composition of claim 1 wherein the weight ratio of Zr+Ti: inositol phosphate ester: silica is in the range of 1-200: 1-500: 20-2000.

3. The composition of claim 2 exhibiting a pH value of from 1 to 7.

4. The composition of claim 1 wherein the inositol is myoinositol.

5. A process for imparting corrosion resistance and paint receptivity to a metal surface comprising applying the composition of claim 3 to the surface and drying the film without an intervening rinse to yield a dry coating of 100-3000 mg/m$^2$.

6. The process of claim 5 wherein the applied wet film is 1-20 g/m$^2$.

7. The process of claim 5 wherein the metal is selected from the group consisting of iron, zinc, aluminum and their alloys.

8. An article coated by the process of claim 5.

* * * * *